United States Patent [19]

Awalt, Jr.

[11] 4,050,626
[45] Sept. 27, 1977

[54] SUPPLEMENTAL HEAT AND HEAT TRANSFER SUBSYSTEMS FOR SOLAR AIR CONDITIONING SYSTEMS

[76] Inventor: Thomas Y. Awalt, Jr., 804 Poinciana Drive, Gulf Breeze, Fla. 32561

[21] Appl. No.: 569,556

[22] Filed: Apr. 18, 1975

[51] Int. Cl.² .................... F24D 3/00; F24J 3/02
[52] U.S. Cl. ...................... 237/1 A; 237/8 R; 126/271; 126/400; 126/132; 126/121; 126/140; 126/141; 62/2
[58] Field of Search ............. 237/1 A, 53, 51, 56; 126/120–122, 125, 132, 141, 131, 271, 400, 140; 62/2

[56] References Cited

U.S. PATENT DOCUMENTS

| 147,771 | 2/1874 | Hayden | 237/56 |
|---|---|---|---|
| 1,467,474 | 9/1923 | Day | 237/56 |
| 1,670,913 | 5/1928 | Stricker | 237/56 |
| 1,853,480 | 4/1932 | Wheeler et al. | 237/1 A |
| 1,888,620 | 11/1932 | Clark | 237/1 A |
| 1,945,975 | 2/1934 | Munters | 62/2 |
| 2,453,954 | 11/1948 | Wright | 237/51 |
| 2,553,302 | 5/1951 | Cornwall | 237/56 |
| 2,559,271 | 7/1951 | Baines | 126/132 |
| 2,622,587 | 12/1952 | Dupler | 126/132 |
| 3,608,818 | 9/1971 | VonFellenberg | 237/63 |
| 3,910,490 | 10/1975 | Saypalia, Jr. | 237/1 A |
| 3,958,755 | 5/1976 | Cleer, Jr. | 237/19 |

FOREIGN PATENT DOCUMENTS 379,418  9/1932  United Kingdom .......... 126/141

Primary Examiner—John J. Camby
Assistant Examiner—Henry C. Yuen

[57] ABSTRACT

Heat storage and/or cold storage are essential in air conditioning systems depending upon weather-sensitive energy sources such as solar heat, including sun and wind. Sufficient supplemental heating sub-systems are also desirable if not essential. Liquid heat storage is the preferred method of storing heat or cold. This invention provides a supplemental heating and dual function heat transfer sub-system for a solar heating system which employs a liquid heat storage medium and a heat storage unit. The sub-system includes a heating unit having a combustion area, a first direct heat transfer means for transferring the heat from the combustion area to the liquid heat storage medium, and a second adjustably regulated direct heat transfer means between the liquid heat storage medium and the living space. If there is combustion in the combustion area, the heat storage medium may be heated or the living space may be heated or both. If there is no combustion in the combustion area, the heat from the heat storage unit may be radiated or otherwise distributed to the living space through the heating unit.

21 Claims, 6 Drawing Figures

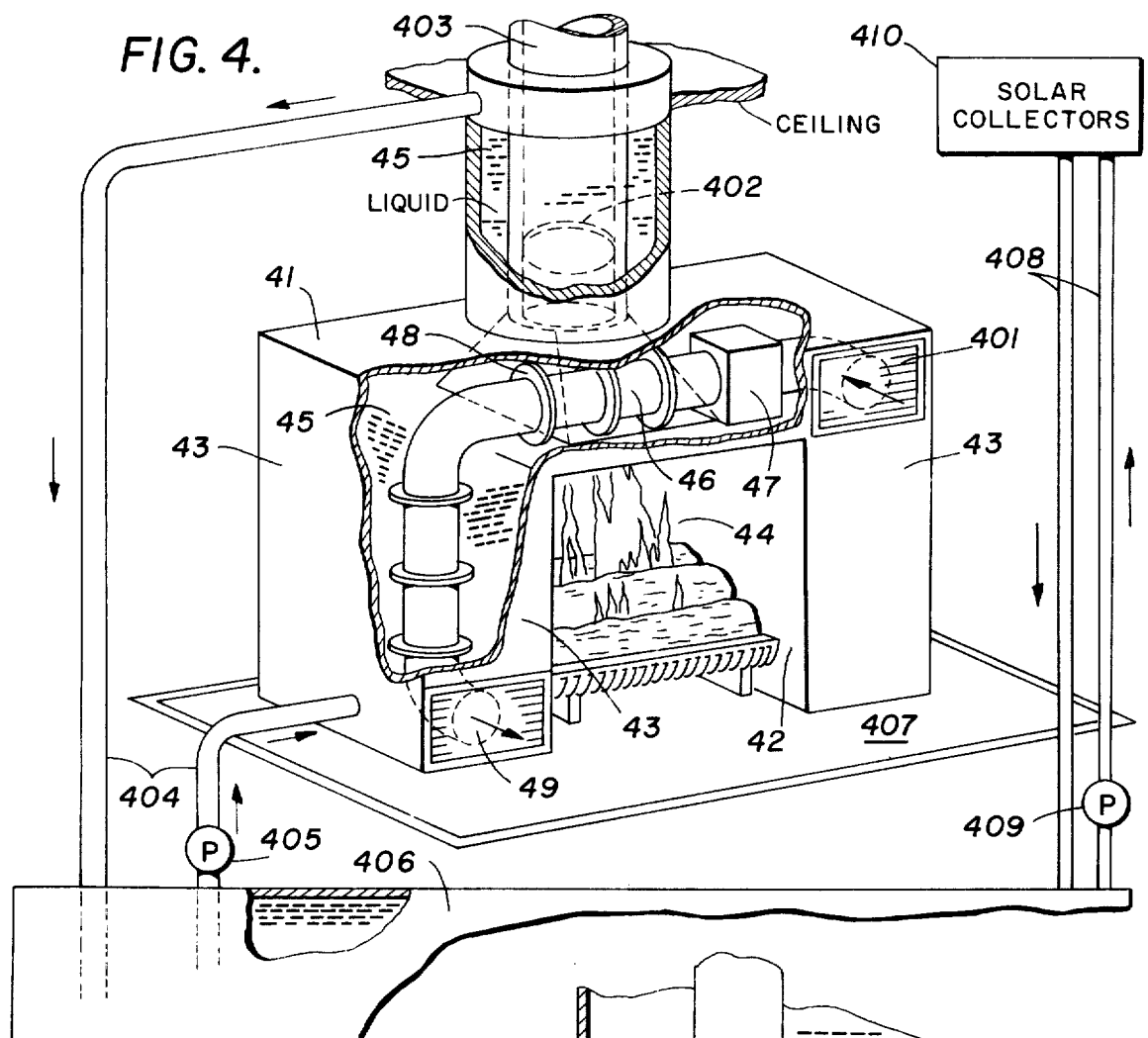
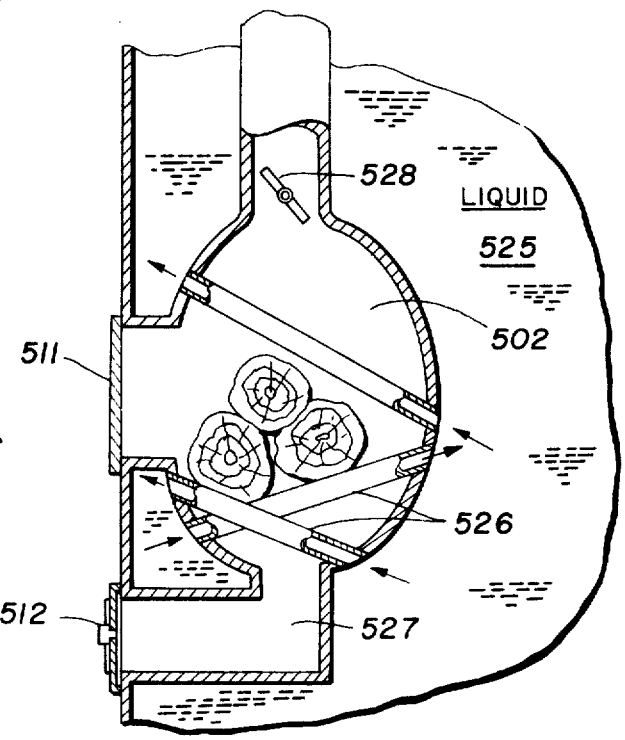

SUPPLEMENTAL HEAT AND HEAT TRANSFER SUBSYSTEMS FOR SOLAR AIR CONDITIONING SYSTEMS

Reference is hereby made to my copending U.S. Pat. Application Ser. No. 540,866, filed Jan. 14, 1975.

BACKGROUND OF THE INVENTION

With energy declining and energy demands rising, the need for heating and cooling systems, independent or nearly independent of central electrical power sources becomes ever-increasing. Heretofore, some success has been obtained with solar heat; but the major disadvantage in solar heating systems for shelters is that demands for heat and/or cold in the shelter is heaviest when the supply of solar energy is at its natural ebb. Heat from the sun must be stored for use when the sun is not shining. Wind, as a source of energy cannot be depended upon as a source of heat during periods of calm. The wind and sun are indeed weather-sensitive energy sources. A source of energy which is not weather-sensitive may become weather-sensitive, to a certain extent, by the harnessing means employed. For example, an evaporator-condenser system which takes heat from the outside atmosphere, releasing it into the shelter, will operate more efficiently during the day when the outside atmosphere is warmer than it will during the night when the outside temperature is much lower.

Convenience controlled non-weather-sensitive heat sources are not always available on a constant basis. For example, a fireplace may be conveniently operated for only about three hours during most evenings. An oven may be operated for another two hours. An incinerator for disposal of trash or garbage may operate for yet another hour. Ultimately, all or most of these readily available "controlled" heat sources should be fully utilizable in home air conditioning systems without significant loss of heat to the outside atmosphere.

To permit continuity of air conditioning, therefore, for periods of low energy-producing weather and/or inconvenient controlled heat operation of weather-sensitive sources and/or convenience-controlled non-weather-sensitive-sources, one should look to a heat and/or cold storage facility. This facility, or unit, may be fully integrated into the auxiliary heat source, or it may be remote thereto. Most desirable is a direct heat transfer between the heat of combustion in an auxiliary heating source and the liquid in the heat storage unit. Also, desirable is a direct heat transfer relationship between the heat of combustion in the auxiliary unit and the living space. The former is not easily attainable with respect to shelters built before the onset of the realization that solar heat must eventually be utilized; and in such systems, heat storage units will ordinarily be remote from auxiliary heat systems.

Remote or not, auxiliary or supplemental heat sub-systems should provide wherever possible, the most efficient heating means for the living space and/or the liquid heat storage medium, wherever stored; and of course it must be possible to direct the heat, on an as required basis, to either.

Prior supplemental heating systems have accomplished heating of the living space and/or heating of the heat storage medium, but not in the sense that both were direct heat transfers, in which maximum efficiency is most easily attained.

In U.S. Pat. No. 3,812,903, for example, auxiliary heat is applied indirectly to the liquid in the hot or cold storage unit by means of heating the air which is blown through a rock pile, thereby circulating the air around the tank of liquid in which is contained the liquid heat storage medium. Where minimual auxillary heat is desired, as with a conventional oil or electric furnace, such an indirect heat transfer for the auxillary heat of combustion into the heat storage unit may suffice. Where part-time sub-systems, such as fireplaces or coal furnaces are employed, it may be much more desirable to create a surplus of heat for a short period of time, and to use such surplus for heating the storage medium, as well as, to a certain extent, the living space; but to insure all the while that all of such surplus heat is utilized.

In recent years, fireplaces have been improved to some extent in efficiency as an immediate source of heat. Warm air circulation systems have been provided whereby a large measure of the heat potential is circulated to the living space of a shelter. Further improvements in fireplace efficiency have not been sought because without heat storage facilities, additional heat served no useful purpose. Present day heat storage facilities do not lend themselves well to the utilization of this major home controlled heat source.

BRIEF DESCRIPTION OF THE INVENTION

Briefly, this invention comprises a supplemental heating and dual function heat transfer sub-system for a solar heating system for a shelter. The sub-system includes a heating unit having a combustion area. Around, adjacent or proximate to the combustion area is a first direct heat transfer means for the heat of combustion to the liquid storage medium. An adjustably regulated means is also provided for a second direct heat transfer between the liquid heat storage medium and the living space. Also provided is means for circulating the liquid heat storage medium to and from the area or point of first direct heat transfer to and from the heat storage unit so that the heating unit may function to transfer heat to the living space when there is no combustion in the combustion area.

Included within the concept, albeit not essential thereto are means for providing yet a third direct heat transfer of the heat of combustion to the living space itself.

This combination permits the fireplace, for example, to be used with a high degree of efficiency, to some extent for immediate heat for the living space, and to a greater or lesser extent of the remainder for heat storage. It also permits the heating unit to operate as a radiator or spaceheater during periods when there is no combustion in the combustion area.

In the detailed description, reference will be made to the drawing in which:

FIG. 4 is a perspective semi-schematic view of yet another embodiment of this invention which comprises a free-standing fireplace-type heating unit;

FIG. 6 is a cross sectional view of the combustion area of the heating unit shown in FIG. 5.

DEFINITIONS

By weather sensitive energy harnessing means is meant any energy harnessing means for heating and cooling wherein, because of the source of the energy, or the method of collecting the energy, weather becomes a substantial factor. The weather sensitivity of solar heat collectors and windmills, for example, is readily apparent and the energy source itself, may be classified as weather sensitive. Certain energy harnessing systems also have substantial inherent weather sensitivity, as for example, evaporator-condensor systems in which heat is removed from the living space and discharged into the ambient atmosphere, as in present day convential air conditioning systems, which function much more efficiently during the cooler night hours than during the warmer daytime hours. Some conventional evaporator-condenser systems are used for heating, and it is well known that such systems remove heat from the outside ambient atmosphere and release heat in the living space. These systems are even more weather-sensitive because their efficiency dwindles to a very low percentage at about 20 degrees fahrenheit. Such systems, in most climates, can be made to operate much more efficiently during the warmer daytime hours than during the cooler nights.

By air conditioning system is meant any system for conditioning air for temperature and/or humidity by means of heating and cooling.

By direct heat transfer relationship is meant that heat or cold is passed directly from one medium or its container wall to another medium without the necessity of any intermediate transmission means. A combustion chamber surrounded by water is in direct heat transfer relationship with the water. Such relationship may be entirely radiant or it may involve convection, forced air or conduction as well.

DETAILED DESCRIPTION OF PREFERRED EMBODIMENTS

Figure 1:
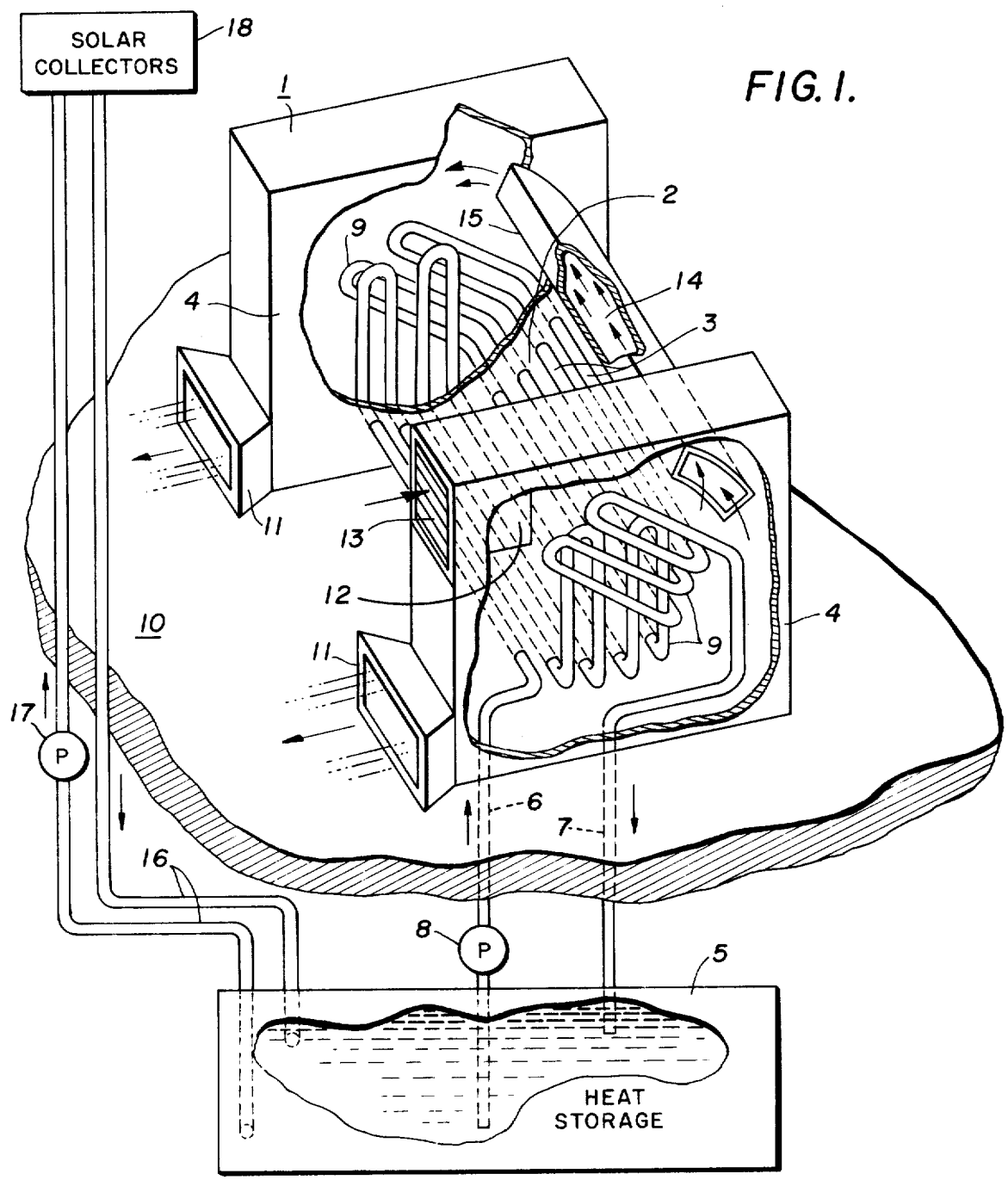
FIG. 1 is a semi-schematic perspective of the first embodiment of this invention is suitable for use as a fireplace insert for a fireplace of the prior art.

Referring now in detail to FIG. 1, heating unit 1 comprises dual function liquid heat exchange lines 3 between liquid-air heat exchangers 4 defining combustion area 2. The first direct heat transfer means is provided by lines 3 to which liquid is supplied from liquid heat storage unit 5 through liquid lines 6 and 7, with a force provided by pump 8. The heated liquid in lines 3 runs through liquid coils 9 in heat exchangers 4, providing liquid-air transfer, the warm air being circulated into the living space through warm air registers 11, and returned through intake vent 13. The force of such circulation is furnished by an intake blower in blower housing 12. Air passage 14 between heat exchangers 4 provides for equalization of air pressure. One wall of air passage 14 is radiant panel 15. Liquid is also circulated by liquid lines 16 from heat storage unit 5, to and from solar collectors 18. As explained above, liquid heat exchange lines 3 provide the first direct transfer of the heat of combustion to the liquid storage medium. They also provide a second direct heat transfer between the liquid heat storage medium and living space 10. Liquid-air heat exchangers 4 supplement the heat transfer between the liquid heat storage medium and living space 10 and such supplemental heat transfer is adjustably regulated in the sense that the intake blower in housing 12, may or may not be placed in operation, and in operation, its speed may be adjusted. A third direct heat transfer between the heat of combustion is provided by radiant panel 15. Of course the speed at which pump 8 is operated will control the amount of heat transfer between the heat of combustion and the liquid heat storage medium. Liquid lines 16 and 17 are for connection to primary solar heating and cooling sources not shown.

Figure 2:
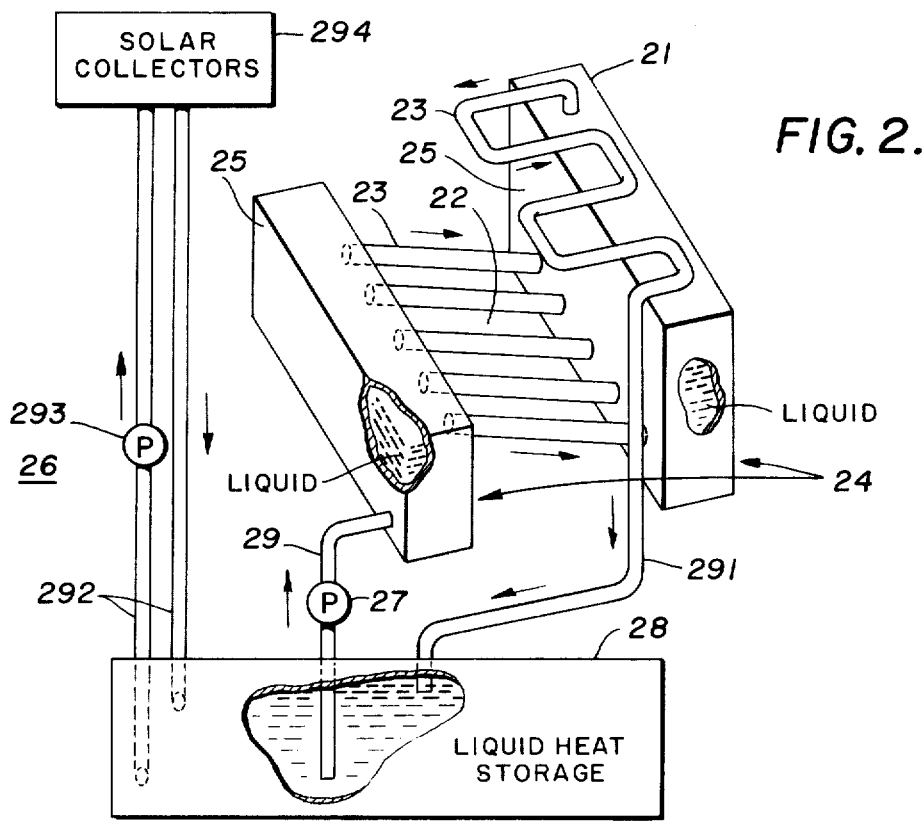
FIG. 2 is a perspective semi-schematic view of the second embodiment of this invention which is suitable for use as a fireplace insert for a prior art fireplace.

Referring now in detail to FIG. 2, heating unit 21 comprises liquid-filled dual function heat exchangers 24 and dual function heat exchange lines 23 defining combustion area 22. Radiant panels 25 face living space 26, and are heated by the liquid storage medium in heat exchangers 24. Pump 27 provides the circulation of liquid heat storage unit 28 via liquid line 29, the pump providing continuous circulation of the liquid through both heat exchangers, the liquid heat exchange line 23, and return through liquid line 291. Liquid lines 292 are connected to solar heat collectors 294 with storage unit 28. Pump 29 provides circulation. The first direct heat transfer of the heat of combustion to the liquid heat storage medium takes place primarily in heat exchange lines 23. The second direct heat transfer between the liquid heat storage medium and the living space takes place primarily through radiant panels 25 of heat exchangers 24. Of course, when there is no fire in the combustion area, heat exchange lines 23 will also serve to provide heat transfer between the liquid heat storage medium and the living space.

Figure 3:
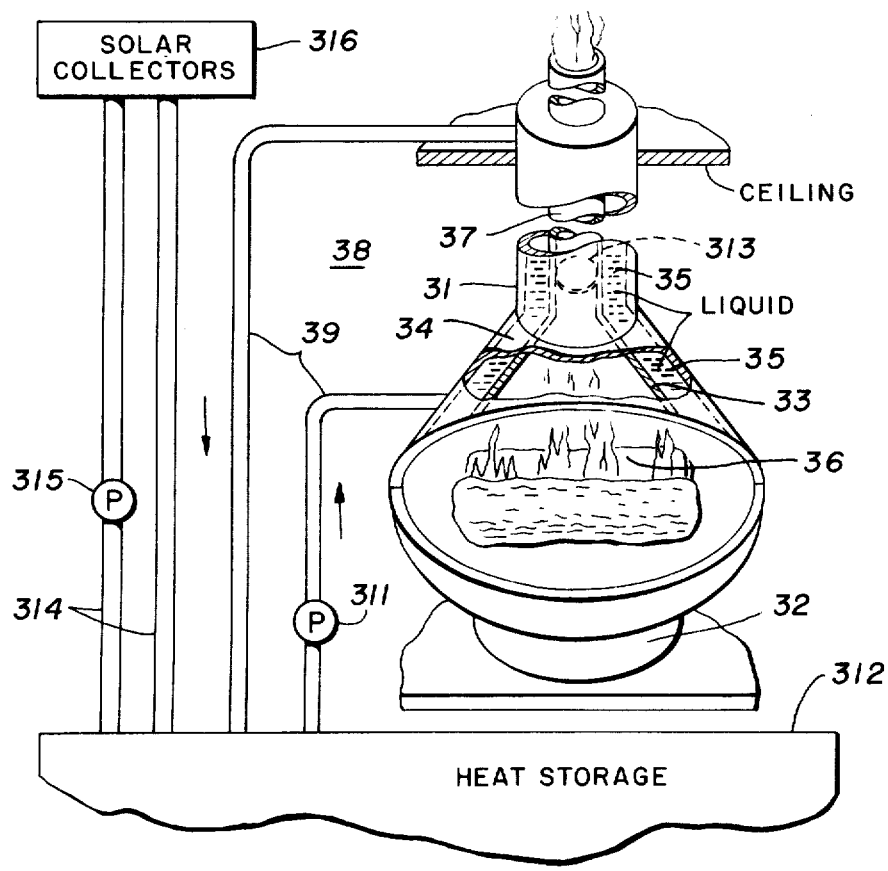
FIG. 3 is a perspective semi-schematic view of a free-standing fireplace suitable for use in the sub-system of this invention.

Referring now in detail to FIG. 3, combustion area 36 of heating unit 31 is defined by base 32 and inner wall 33. Between inner wall 33 and radiant panel 35 is liquid jacketed space 34. Liquid lines 39 and pump 311 provide circulation between heating unit 31 and liquid heat storage 312. Heating Unit 31 is provided with flue 37 and damper 313. Pump 315 circulates the liquid between solar collectors 316 and heat storage 312 via liquid lines 314. The first direct heat transfer between the heat of combustion and the liquid storage medium takes place between combustion area 36 and the liquid in jacketed space 35 through innerwall 33. The second direct heat transfer means between the liquid heat storage medium and living space 38 is provided by radiant panel 35. The amount of heat radiated by radiant panel 35 is controlled by the speed of pump 311.

Referring now in detail to FIG. 4. Combustion area 44 of heating unit 41 is defined by interior radiant panels 42 and hearth 407. Within the interior radiant panels 42 and exterior radiant panels 43 is jacketed liquid space 45 which also surrounds a portion of flue 403. Flue 403 is also provided with damper 402. Liquid lines 404 provide liquid circulation between liquid heat storage 406 and heat unit 41, employing pump 405 for circulation. An auxillary optional forced air circulation system is provided by air passage 46 with heat transfer discs 48. Air enteres the liquid-air heat transfer system through air intake register 401, and with the force of blower 47 is circulated through air passage 46 and out through warm air discharge register 49. Solar collectors also heat the liquid which is circulated through liquid lines 408 by pump 409. The first direct heat transfer between the area of combustion and the liquid heat storage medium takes place through interior radiant panels 42.

There are two "second" heat transfer means between the liquid storage medium and living space. The first is through exterior radiant panel 43, and the second is through the warm air passage 46, furnishing warm air in a supplemental second direct heat transfer means. The second heat transfer is adjustably regulated by the speed of pump 405 and as well, as by the speed of blower 47.

Figure 5:
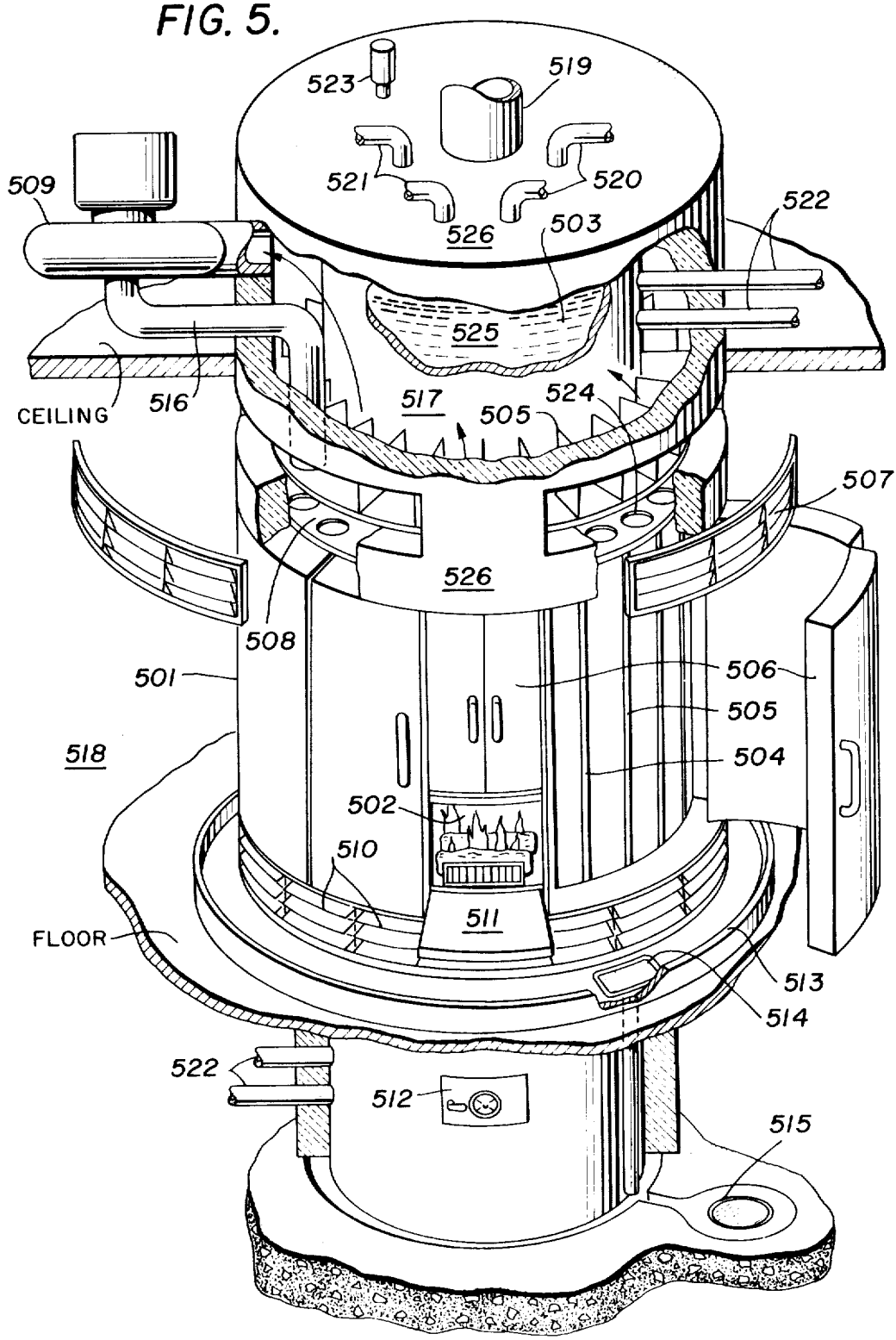
FIG. 5 is a perspective semi-schematic heating unit in which the unit itself is combined with the heat storage unit.

Referring now in detail to FIGS. 5 and 6. Heating unit 501 comprises as an integral part thereof, heat storage tank 517 which is located within living space 518. Within tank 517, as shown more clearly at FIG. 6, is combustion area 502 with convection conduits for the conveyance and circulation of liquid 525. Also shown at FIG. 6 are ash pit 527 with ash pit door 512, as well as damper 528. Liquid heat storage tank 517 is equipped with fluid lines 522 for source and supply connections for external radiators or other supplemental heat dissemination means. Fluid lines 520 and 521 are connected to solar heating sources not shown. Pressure relief valve 523 prevents possible explosion of the tank. Tank 517 is surrounded by insulation 524, except where the surface of the tank is provided with insulated doors 506, or where there are louver registers 507 or 510. When insulated doors 506 are opened, radiant panel 504 and heating exchange fins 505 are exposed, thereby providing direct heat transfer to living space 518. Usable with or without the direct radiant heat transfer provided when insulated doors 506 are open or partly open is a blower system powered by blower 509 in which, during the heating mode, air enters through self closing louvered registers 507, and circulates around tank 517 to blower 509, thence, through duct 516 into plenim chamber 508 where the air is forced downwardly through plenim distributer 524 between heat exchange fins 505 and out self closing louver register 510. Blower 509 is preferably thermostaticly controlled so that in the normal heating mode, insulated doors 506 remain closed, regardless of whether or not there is combustion in combustion area 502. Combustion area 502 is provided with insulated hinged hearth-cover 511 which will normally be closed when there is no fire in the combustion area. When heating unit 501 is in the cooling mode, the direction of air circulation is reversed. In the cooling mode, there will be condensation on radiant panels 504, and therefore, provisions for drainage are required. Ridge 513 circumscribes a drain collection surface from which water is drained through drains 514 and 515.

Of course insulated doors such as those shown in FIG. 5 may be used in connection with heating units not combined with liquid heat storage units, but it is ordinarily unnecessary to use insulating doors to contain the heat in remote heating units because, when there is no combustion in the combustion area, radiant heating will stop if there is no distribution of liquid to and from liquid storage. Where heating units are separate from storage units, therefore, shielding such as insulated doors will ordinarily not be employed.

In the preferred embodiments of FIGS. 1-4, pumps are shown as a part of the circulation means between the heat storage and the heating unit. This is because the heat storage shown is below the heating unit. It is recognized, of course, that wherever the heat storage unit can be so located that convection may serve alternately or supplementary to the pump, this is most desirable. Ordinarily, however, unless the heat storage is combined with the heating unit, as shown at FIGS. 5 and 6, circulation by convection cannot be employed alternatively or supplementary to circulation by pump unless the heat storage unit is generally in the position and form of a vertically standing tank in which case the heating unit will preferably be combined therewith rather than remote thereto.

In the preferred embodiments showing (except as to the embodiment of FIG. 5, where solar heating sources are not shown) solar collectors are shown as the weather-sensitive energy harnessing means. Of course, there are other such harnessing means usable in accordance with this invention, either alternatively or supplementary, including but not limited to windmills, and solar or electrically powered heat pumps, and air conditioning systems.

Having thus described my invention and several preferred embodiments thereof, I desire to claim my letters patents is:

1. A heating unit for space ambiant to said unit and for liquid medium heat storage comprising:
   1. a combustion area;
   2. a liquid circulating space providing circulation access to a first and second direct heat transfer means;
   3. means proximate to said combustion area for a first direct transfer of heat of combustion from the area of combustion to the liquid medium in said circulating space;
   4. Variably adjustable insulation shielding means for providing and controlling a second direct radiant heat transfer between the liquid medium within said circulating space and the ambiant space.
   5. means proximate to the combustion area for a third direct heat transfer of heat of combustion to the ambiant space including radiant heat of combustion;
   6. positive means, independent of combustion control, first heat transfer control and third heat transfer control and notwithstanding any inherent variable affect on amounts of heat in storage by the weather for substantially variably adjusting the amount of heat transferred by way of the second heat transfer whereby heat in excess of the comfort requirements of the living space may be conserved under variable conditions of weather and varying amounts of heat in storage without substantially diminishing the combustion potential for heat generation, the transfer potential for first direct heat transfer and the transfer potential for the third direct heat transfer.
   7. feed and return means whereby liquid medium may be returned from the liquid circulating space to heat storage and fed from heat storage to the liquid circulating space;
   8. circulation means within said circulating space whereby the liquid medium may circulate between the first and second direct heat transfer means, whereby the temperature of space ambiant to the unit may be regulated, to the extent permitted by the potential of the second direct heat transfer and the heat in storage, in the presence of and in the absence of combustion in the combustion area, and without substantially dimmishing the heat generating and storage potential of the first direct heat transfer, employing the liquid heat storage medium at varying temperatures by variably adjusting heat transfer between the liquid heat storage medium and the living space.

2. The heating unit of claim 1 wherein the third direct heat transfer means is substantially adjustably regulated.

3. The heating unit of claim 2 wherein the third direct radiant heat transfer means is substantially adjustably regulated by removal and replacement of insulation shielding between the combustion area and the ambiant space.

4. The heating unit of claim 1 wherein positive means (6) for adjusting the second direct heat transfer means includes regulating means for the volume of circulation flow of the liquid medium to and from the area of first direct heat transfer whereby the liquid medium may be drawn off from the area of the second direct heat transfer and replaced with liquid medium at a substantially different temperature.

5. The heating unit of claim 1 further including heat storage means proximate to said circulating space wherein the second direct heat transfer means is substantially independently adjustably regulated by removal and replacement of insulating shielding between the heat storage means and the ambiant space.

6. The heating unit of claim 1 further including means for forced air circulation whereby air is circulated from the living space around at least a portion of the unit and back to the living space.

7. The heating unit of claim 1 wherein the second direct heat transfer means comprises radiant and forced air circulation heat transfer.

8. The heating unit of claim 1 wherein the heat storage unit is also alternately a cold storage unit and the liquid heat storage medium is also alternately a liquid cold storage medium; the means for first direct heat transfer, in the absence of combustion, also alternatively provides means for transferring cooling from the cold storage medium to the ambiant space; the means for providing a second direct heat transfer between the liquid heat storage medium and the ambiant space also alternately provides a means whereby controlled cooling may be transferred from the liquid heat storage medium to the ambiant space; the positive means for adjusting the second heat transfer is alternately a means of adjusting transfer of cool to the ambiant space; and where the means for circulating liquid heat storage medium to and from the first direct heat transfer to and from the heat storage also alternately provides a means whereby the first direct heat transfer means may be employed as required to transfer cooling from the liquid heat storage medium to the ambiant space.

9. The heating unit of claim 1 further including liquid storage means.

10. A supplemental heating and dual function heat transfer sub-system for a solar heating and air conditioning system for a shelter having a living space, the solar system including weather-sensitivity energy harnessing means, a liquid heat storage medium and liquid heat storage, the sub-system comprising:
  1. combustion area,
  2. means proximate to said combustion area for a first direct transfer of heat of combustion from the combustion area to the liquid heat storage medium whereby, in the presence of combustion, heat of combustion may be transferred from the combustion area to the liquid heat storage medium, and, in the absence of combustion, stored heat may be transferred to the living space from the liquid heat storage medium;
  3. Variably adjustable insulation shielding means proximate to the combustion area and first heat transfer means for a second direct radiant heat transfer between the liquid heat storage medium and the living space;
  4. means proximate to the combustion area for a third direct heat transfer of heat of combustion to the living space including radiant heat of combustion;
  5. positive means, independent of combustion conrol, first heat transfer control and third heat transfer control and notwithstanding any inherent variable affect on amounts of heat in storage by the weather via the weather-sensitive energy harnessing means, for substantially variably adjusting the amount of heat transferred by way of the second heat transfer whereby the heat in excess of the comfort requirements of the living space may be conserved under variable conditions of weather and varying amounts of heat in storage without substantially diminishing the combustion potential for heat generation, the transfer potential for first direct transfer, the transfer potential for the third direct heat transfer and the maximum potential of the weather sensitive energy harnessing means.
  6. means for circulating the liquid heat storage medium to and from the first direct heat transfer to and from heat storage.
  7. means for circulating the liquid heat storage medium to and from heat storage, to and from the second direct heat transfer.

Whereby, in combination, the temperature of the living space may be regulated, to the extent permitted by the potential of the second direct heat transfer and the heat in storage, in the presence of and in the absence of combustion in the combustion area, and without substantially dimminishing the heat generating and storage potential of the weather-sensitive energy harnessing means or the first direct heat transfer, employing the liquid heat storage medium at varying temperatures resulting from the weather sensitive energy harnessing means by variably adjusting heat transfer between the liquid heat storage medium and the living space.

11. The sub-system of claim 10 wherein the third direct heat transfer means is variably substantially adjustably regulated.

12. The sub-system of claim 10 further including means for removal and replacement of insulation shielding between the combustion area and the living space.

13. The sub-system of claim 10 wherein positive means (5) for adjusting the second direct heat transfer means includes heat storage means and means for variably adjustable removal and replacement of insulation shielding between the heat storage means, and the living space.

14. The sub-system of claim 10 wherein positive means (5) for adjusting the second direct heat transfer means includes regulating means for the volume of circulation flow of the liquid medium to and from the area of first direct heat transfer, whereby the liquid medium may be drawn off from the area of the second direct heat transfer and replaced with liquid medium at a substantially different temperature.

15. The sub-system of claim 10 further including means for forced air circulation whereby air is circulated from the living space around at least a portion of the unit and back to the living space.

16. The sub-system of claim 10 wherein the second direct heat transfer means comprises means for radiant and forced air circulation heat transfer.

17. The sub-system of claim 10 further including a means for cooling the liquid heat storage medium wherein the heat storage is alternately a cold storage and the liquid heat storage medium is alternately a liquid cold storage medium; the means for first direct heat transfer, in the absence of combustion, also alternatively provides means for transferring cooling from the cold storage medium to the living space; the means for providing a second direct heat transfer between the liquid heat storage medium and the living space also alternately provides a means whereby controlled cooling may be transferred from the liquid heat storage medium to the living space; the positive means for adjusting the second heat transfer is alternately a means of adjusting transfer of cool to the living space; and where the means for circulating liquid heat storage medium to and from the first direct heat transfer to and from the heat storage also alternately provides a means whereby the first direct heat transfer means may be employed as required to transfer cooling from the liquid heat storage medium to the living space.

18. The method of heating a living space from a controlled heat source and storage of heat in liquid storage comprising the steps of intermittently heating a liquid in a first direct heat transfer from the controlled heat source to the liquid, heating the living space as required for comfort and conservation during heating of the liquid and during intervals in heating of the liquid by way of said first direct heat transfer in a second direct heat transfer between said liquid and said living space, and a third direct heat transfer between said heat source and said living space, said second heat transfer being controlled by an insulation shield which is substantially variably and independently of but coordinated with control of said controlled heat source, said third heat transfer, and variations in the amount of heat in said liquid storage, circulating the heated liquid during the first direct heat transfer to liquid storage to thereby store heat and, in the absence of first direct heat transfer, circulating the heated liquid from storage to the site of the first direct heat transfer for controlled heating of the living space as required through direct heat transfer.

19. The method of claim 18, where heating a living space and storage of heat also includes alternately cooling a living space and storage of cool, further including alternately intermittently cooling the liquid heat storage medium from a controlled source of cooling in a first alternative direct heat transfer from the liquid to the source of cooling, alternately cooling the living space in a second direct heat transfer from the living space to the liquid, the second direct heat transfer being controlled independently of control of said cooling source, alternatively intermittently circulating the cooled liquid during the first alternative direct heat transfer to liquid storage to thereby store cool, and, in the absence of first and first alternative direct heat transfer, circulating the cooled liquid from storage to the original point of cooling for intermittent alternate controlled cooling of the living space by direct heat transfer as required.

20. The method of claim 18 wherein said control of said second direct heat transfer includes by means of varying said circulation of the heated liquid to and from liquid storage.

21. The method of claim 18 wherein said control of said second direct heat transfer includes by means of varying radiant heat surface exposure to the living space.

* * * * *